March 12, 1968 A. SCHULZ 3,373,366

DYNAMIC LIMITER FOR A FREQUENCY MODULATION RECEIVER

Filed Oct. 30, 1964

INVENTOR.
ALFRED SCHULZ
BY
Frank R. Jinfani
AGENT 3,373,366

DYNAMIC LIMITER FOR A FREQUENCY MODULATION RECEIVER

Alfred Schulz, Wetzlar, Germany, assignor to North American Philips Company, Inc., New York, N.Y., a corporation of Delaware Filed Oct. 30, 1964, Ser. No. 407,704
Claims priority, application Germany, Oct. 31, 1963, P 32,891
3 Claims. (Cl. 329—131)

ABSTRACT OF THE DISCLOSURE

A limiter circuit for frequency modulation signals in which the signals are applied to biasing network of a parallel circuit of a capacitor and non-linear resistor by way of a diode. A direct current source is connected to the capacitor by way of a resistor for biasing the diode in the pass direction in the absence of signals.

The invention relates to a circuit arrangement for frequency-modulated signals in which a limiter is provided comprising at least one limiter diode, a bias-voltage network connected to said diode, and means for biasing the limiter diode in the pass direction when the signal fails to appear.

In known arrangements in which the limiter diodes have a fixed bias voltage, good limiting results are obtained in the case of fairly high input signals, it is true, but in the case of a low input voltage the limiter does not operate effectively, whereas in this very case a limitation of disturbing peaks produced by noise and the like would be particularly important.

When use is made of known diode-limiters having a bias voltage varying with the signal (dynamic limiter), use is made of a network for example an RC-network storing the bias voltage obtained by rectification, the time constant of said network being high with respect to the period of the lowest modulation frequency, in order to achieve also in this frequency range a satisfactory limiting of undesirable amplitude fluctuations. Owing to said high time constant, the diode voltage remains, however, higher than the signal amplitude for a fairly long period of time at an abrupt decrease in signal strength, so that limitation is no longer obtained and amplitude disturbances become audible in the form of noise or hissing sounds.

In order to reduce such noise phenomena occurring in the event of abrupt signal fluctuations, it is known to apply such an additional bias voltage to the limiter diode that, when a signal is lacking, the diode is biased in the pass direction. It is thus achieved that the diodes become operative as short circuits for the resultant noise signal, so that the noise voltages can no longer penetrate into the further stages of the receiver.

Owing to the high time constant of the bias-voltage member required for limitation with low frequencies, a fairly long period is nevertheless required for the capacitor of the RC-network to be discharged under the action of the applied additional bias voltage after the signal has failed to appear, in order to produce the short circuit for the noise signals.

In a circuit arrangement of the kind set forth a satisfactory freedom of disturbances with high and low signals is obtained and even with abrupt signal fluctuations a troublesome increase in the noise level is drastically reduced, if in accordance with the invention the bias-voltage network is provided with a non-linear resistor, the value of which is high for low voltages as compared with the value at high voltages. This measure results in that with low signal amplitudes exceeding the noise level the bias voltage matches the average signal amplitude, whereas in the major part of the signal amplitude range, in which said amplitude is high as compared with the noise signal, the bias voltage is lower than the normally appearing signal amplitude, whilst with an abrupt drop in signal amplitude the voltage of the bias-voltage member remains higher than the peak amplitude of the signal at the most during a negligible time interval.

With low signal amplitudes, which do not exceed the noise level considerably, the arrangement operates as a dynamic limiter, in which the voltage of the bias-voltage member automatically matches the signal amplitude, so that even with considerable differences in signal amplitude a satisfactory limitation is obtained. With high signal amplitudes the bias voltage is lower than the normal signal amplitude so that during each period of the oscillation a strong limitation occurs, the fluctuations exceeding the limit values being cut off and rendered ineffective. This also provides a drastic suppression of the so-called reflection distortion. Measures are furthermore taken to ensure that the bias voltage of the limiter drops rapidly when the signal amplitude drops abruptly. This is achieved on the one hand by the fact that the capacitor of the bias-voltage member is charged not in proportion to the signal amplitude but only up to the limit value of the non-linear resistor, so that for this very reason the discharge of the capacitor is performed more rapidly in the event of signal drops and on the other hand also by the fact that for the limitation a considerably smaller capacitor may be used than in the known arrangement.

The invention will now be described more fully with reference to the accompanying drawing, in which.

Figure 1:
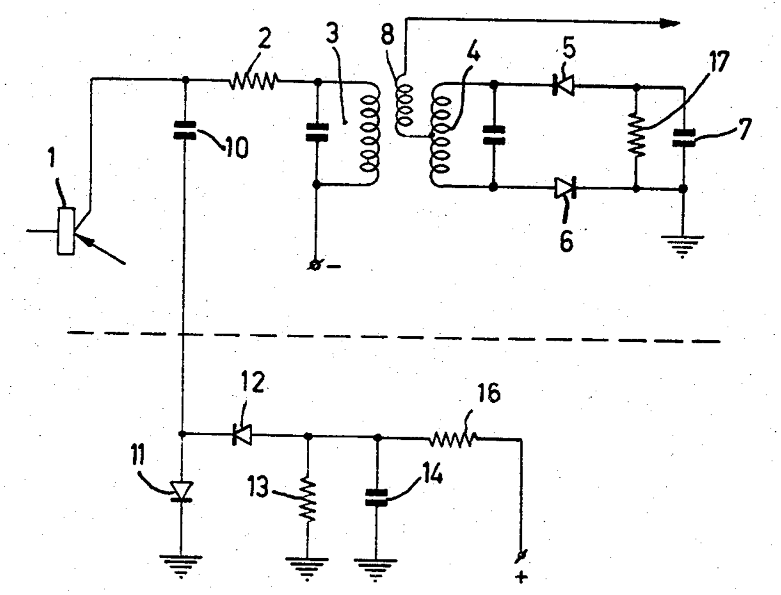
FIG. 1 shows a known circuit arrangement.

FIG. 1 shows an arrangement in which frequency-modulated I.F. oscillations from the output of a transistor 1 are applied through a resistor 2 to a resonant circuit 3 associated with the input bandpass filter of a ratio detector, the other end of said circuit being connected to a supply source. This resonant circuit 3 is coupled with a secondary resonant circuit 4, the ends of which are connected to the cathode and the anode of the diodes 5 and 6 respectively, the other electrodes of which are connected to each other through a load resistor 17 and a parallel connected smoothing capacitor 7. The cathode of the diode 6 is connected to ground. The demodulated low frequency output signals are derived in the conventional manner from one end of an auxiliary coil 8 coupled to the primary winding, the other end of coil 8 being preferably connected to a center tap of circuit 4.

The primary circuit 3 is connected in parallel with the series combination of a capacitor 10 of for example 1500 pf. or more and a circuit, which comprises two diodes 11 and 12, which are connected by their anode and cathode to each other and to the capacitor 10. The cathode of the diode 11 is connected to ground and between the anode of the diode 12 and ground there is provided a bias-voltage network consisting of the parallel combination of a resistor 13 and a capacitor 14. This capacitor preferably has a low ohmic resistance; it is formed for example by a paper capacitor or a lacquer-foil capacitor.

A bias voltage is applied to the bias-voltage network 13, 14 through a series resistor 16 from a positive voltage source. The diodes 11 and 12 are therefore conducting at low input signals and produce a strong damping so that the noise appearing in this amplitude range is suppressed. Not until the signal amplitude exceeds strongly the noise level, the rectifying effect produces a negative voltage across the capacitor 14, where the normal limiting effect starts.

It is known that the bias-voltage member formed by the resistor 13 and the capacitor 14 must have a time constant, of for example 1 sec., which is sufficiently long for ensuring an adequate limitation even for the lowest modulation frequencies. This involves, however, that the diodes 11 and 12 become conducting a certain period of time after the lacking of the signal, so that for a short, but observable period the noise is audible.

Figure 2:
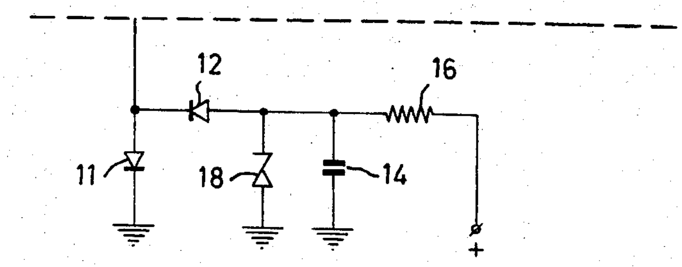
FIG. 2 shows an embodiment of a frequency-modulation arrangement according to the invention.

In order to obviate this disadvantage the bias-voltage member in the arrangement according to the invention shown in FIG. 2 comprises a non-linear element 18, the resistance value of which at low voltages is high with respect to the value at high voltages. The element 18 may be formed for example by a selenium stabilizer or a Zener diode or even by a voltage-dependent resistor.

Thus, above a limit value of the voltage the effect of a constant limiter is obtained; a decrease in signal amplitude, such that the signal does not drop below said limit value, then remains within the range of action of said constant-limiter so that the signal-amplitude variation does not become audible.

With an abrupt lack of signal, for example in car radio-receivers, where this phenomenon of frequent occurrence for example due to the screening effect of trees and the like, the capacitor 14 is rapidly discharged by the positive voltage across the resistor 16 due to the effects described in the preamble and a result thereof the diodes 11 and 12 are biased in the pass direction directly after the signal drop. The noise and hissing sounds still audible in the known arrangements are thus completely suppressed in the arrangement according to the invention.

It is also possible to connect the voltage-stabilizing element in parallel with the load network 17, 7 of the ratio detector or to use it instead of the resistor 17, in which case the additional limiter 10–14 may be omitted.

In a car radio-receiver the capacitor 14 may have a value of 0.1 μf.

Instead of using two diodes 11 and 12, use may be made of a single diode, the other diode being replaced by a resistor. However, in this case two-way rectification is not obtained, so that no two-way limitation is ensured; disturbances are suppressed in this case to a considerably lesser extent.

What is claimed is:

1. A circuit for limiting frequency modulated signals comprising a resonant circuit tuned to the signals to be limited, means for applying the signals to be limited to the resonant circuit, at least one diode having first and second terminals, means connecting said first terminal to the resonant circuit, a bias-voltage network, means connecting said second terminal to said bias-voltage network for biasing the said diode in the cut-off direction when the said signals appear across said resonant circuit, said bias-voltage network comprising a parallel circuit of a capacitor and a non-linear resistor having a resistance which is high at low voltages as compared with the resistance value at high voltages, a direct current source, and means connecting said direct current source across said bias-voltage network for biasing said diode in the pass direction when the said signals fail to appear across said resonant circuit.

2. A circuit for limiting frequency modulated signals comprising a resonant circuit tuned to the signals to be limited, and means connected to apply the signals to be limited to the resonant circuit, first and second diodes each having anode and cathode electrodes, means connecting the anode of said first diode and the cathode of said second diode to the resonant circuit, a bias-voltage network having first and second terminals, means connecting the first terminal of the bias-voltage network to the cathode of the first diode and means connecting the second terminal of the bias-voltage network to the anode of the second diode, said bias-voltage network comprising the parallel circuit of a capacitor and a non-linear resistor, the resistance of said resistor being high at low voltages as compared with its resistance at high voltage, a direct current source, and means connecting said direct current source across said bias-voltage network for biasing said first and second diodes in the pass direction when the said signals fail to appear across said resonant circuit.

3. A circuit as claimed in claim 2 for limiting frequency modulated signals and for detecting said frequency modulated signals, comprising means for deriving detected signals from between said bias-voltage network and said resonant circuit.

References Cited

UNITED STATES PATENTS

| | | | |
|---|---|---|---|
| 2,878,377 | 3/1959 | Hargreaves | 325—348 |
| 3,060,326 | 10/1962 | Watson | 307—88.5 |
| 3,204,119 | 8/1965 | Gray | 329—130 X |
| 3,234,469 | 2/1966 | Gunn | 325—348 |
| 3,277,362 | 10/1966 | Elliott | 307—88.5 |
| 3,300,723 | 1/1967 | Hansen | 325—348 |

ALFRED L. BRODY, *Primary Examiner.*